(12) United States Patent
Crouse

(10) Patent No.: US 9,196,400 B2
(45) Date of Patent: Nov. 24, 2015

(54) SYSTEMS AND METHODS FOR PRODUCING CABLE

(75) Inventor: Glenn Edward Crouse, Prosperity, PA (US)

(73) Assignee: BELDEN INC., St. Louis, MO (US)

( * ) Notice: Subject to any disclaimer, the term of this patent is extended or adjusted under 35 U.S.C. 154(b) by 196 days.

(21) Appl. No.: 13/333,066

(22) Filed: Dec. 21, 2011

(65) Prior Publication Data
US 2013/0161855 A1 Jun. 27, 2013

(51) Int. Cl.
*H01B 13/24* (2006.01)
*H01B 13/02* (2006.01)

(52) U.S. Cl.
CPC ............ *H01B 13/24* (2013.01); *H01B 13/0228* (2013.01)

(58) Field of Classification Search
CPC .. B29C 53/14; B29C 47/027; B29C 47/0059; D02G 1/0226; D02G 1/0266; D02G 3/28; D07B 2201/2024; D07B 2201/2025; D07B 2201/2027; D07B 2207/204; D07B 2207/207; H01B 13/0214; H01B 13/0221; H01B 13/0228; H01B 13/0235; H01B 13/24
USPC ................... 57/12, 14; 264/171.16
See application file for complete search history.

(56) References Cited

U.S. PATENT DOCUMENTS

| | | | | |
|---|---|---|---|---|
| 3,082,868 A * | 3/1963 | Hubbard | ........................ | 242/362 |
| 3,367,097 A * | 2/1968 | Menasoff | ........................ | 57/294 |
| 3,686,843 A * | 8/1972 | Alimenti | ............................ | 57/12 |
| 3,851,454 A * | 12/1974 | Beyer et al. | ..................... | 57/312 |
| 4,186,897 A * | 2/1980 | Brown | ........................ | 242/147 R |
| 4,196,576 A * | 4/1980 | Vogelsberg | ...................... | 57/294 |
| 4,214,432 A * | 7/1980 | Scheidt | ............................ | 57/293 |
| 4,288,976 A * | 9/1981 | Vogelsberg | ..................... | 57/293 |
| 4,740,261 A * | 4/1988 | Moser | ..................... | 156/244.12 |
| 6,101,804 A | 8/2000 | Gentry et al. | | |
| 6,430,913 B1 | 8/2002 | Gentry et al. | | |
| 6,526,738 B2 | 3/2003 | Gentry et al. | | |
| 6,530,205 B1 | 3/2003 | Gentry et al. | | |
| 7,392,647 B2 | 7/2008 | Hopkinson et al. | | |

* cited by examiner

*Primary Examiner* — Matthew Daniels
(74) *Attorney, Agent, or Firm* — Foley & Lardner LLP

(57) ABSTRACT

One embodiment relates to a method for producing cable. The method includes applying an insulative coating to each of a plurality of conductors to form a plurality of insulated conductors. The method further includes taking up the plurality of insulated conductors in a twisting system to twist the plurality of insulated conductors together and apply a first portion of a desired twist to the plurality of insulated conductors. The method further includes paying off the plurality of insulated conductors from the twisting system to further twist the plurality of insulated conductors together and apply a second portion of a desired twist to the plurality of insulated conductors to form a twisted plurality of insulated conductors.

14 Claims, 4 Drawing Sheets

SYSTEMS AND METHODS FOR PRODUCING CABLE

BACKGROUND

The present disclosure relates generally to systems and methods for producing cable, and more specifically, to systems and methods for producing cables having one or more wires together therein and an exterior extruded jacket.

There are many challenges associated with producing such cables. Accordingly, various embodiments disclosed herein are directed to improved systems and methods for producing cables.

SUMMARY

One embodiment relates to a method for producing cable. The method includes applying an insulative coating to each of a plurality of conductors to form a plurality of insulated conductors. The method further includes taking up the plurality of insulated conductors in a twisting system to twist the plurality of insulated conductors together and apply a first portion of a desired twist to the plurality of insulated conductors. The method further includes paying off the plurality of insulated conductors from the twisting system to further twist the plurality of insulated conductors together and apply a second portion of a desired twist to the plurality of insulated conductors to form a twisted plurality of insulated conductors.

Another embodiment relates to a system for producing cables. The system includes a primary extruder system configured to apply an insulative coating to a plurality of conductors to form a plurality of insulated conductors; a twister system configured to twist the plurality of insulated conductors together with a desired twist; and a jacket extruder configured to apply an outer jacket over the twisted insulated conductors to form a cable. The twister system is configured to apply a first portion of a desired twist to the plurality of insulated conductors while taking up the plurality of insulated conductors, and apply a second portion of the desired twist to the plurality of insulated conductors while paying off the plurality of insulated conductors.

Another embodiment relates to a method for applying a twist to a plurality of insulated conductors. The method includes taking up a first plurality of insulated conductors in a twisting system to twist the plurality of insulated conductors together and apply a first amount of twist to the first plurality of insulated conductors; and simultaneously paying off a second plurality of insulated conductors from the twisting system to apply a second portion of the desired twist to the second plurality of insulated conductors.

It is to be understood that both the foregoing general description and the following detailed description are exemplary and explanatory only, and are not restrictive of the disclosure herein.

BRIEF DESCRIPTION OF THE DRAWINGS

These and other features, aspects, and advantages of the present disclosure will become apparent from the following description, claims, and the accompanying exemplary embodiments shown in the drawings, which are briefly described below.

DETAILED DESCRIPTION OF EXEMPLARY EMBODIMENTS

An exemplary cable includes one or more wires (e.g., insulated conductors) configured to transmit signals such as a control signal, a data signal, an audio signal, or a video signal, from one end of the cable to the other end. Multiple conductors in a cable may be twisted together (e.g., to form a twisted pair, triple, quad, etc.). Twisting the conductors together keeps them in close proximity along the length of the cable and can improve the performance of the cable.

Traditionally, to produce cables, bare conductors are fed from an input spool and have an insulating layer applied (e.g., extruded) before being taken up on output spools. The spools of insulated conductors are then physically moved to another station, where the insulated conductors are twisted together with a twisting mechanism and taken up on another output spool. The spool of twisted wires is then physically moved to yet another station, where an outer jacket is applied and the finished cable is taken up on a final output spool. The multiple spool changes can be a safety concern as a worker must physically remove the output spools from each station and move them to another station. The multiple spool changes also represent increases in time, manpower, and floor space needed for the cable manufacturing process. Various embodiments disclosed herein provide for improved systems and methods for producing various types of cable.

Figure 1:
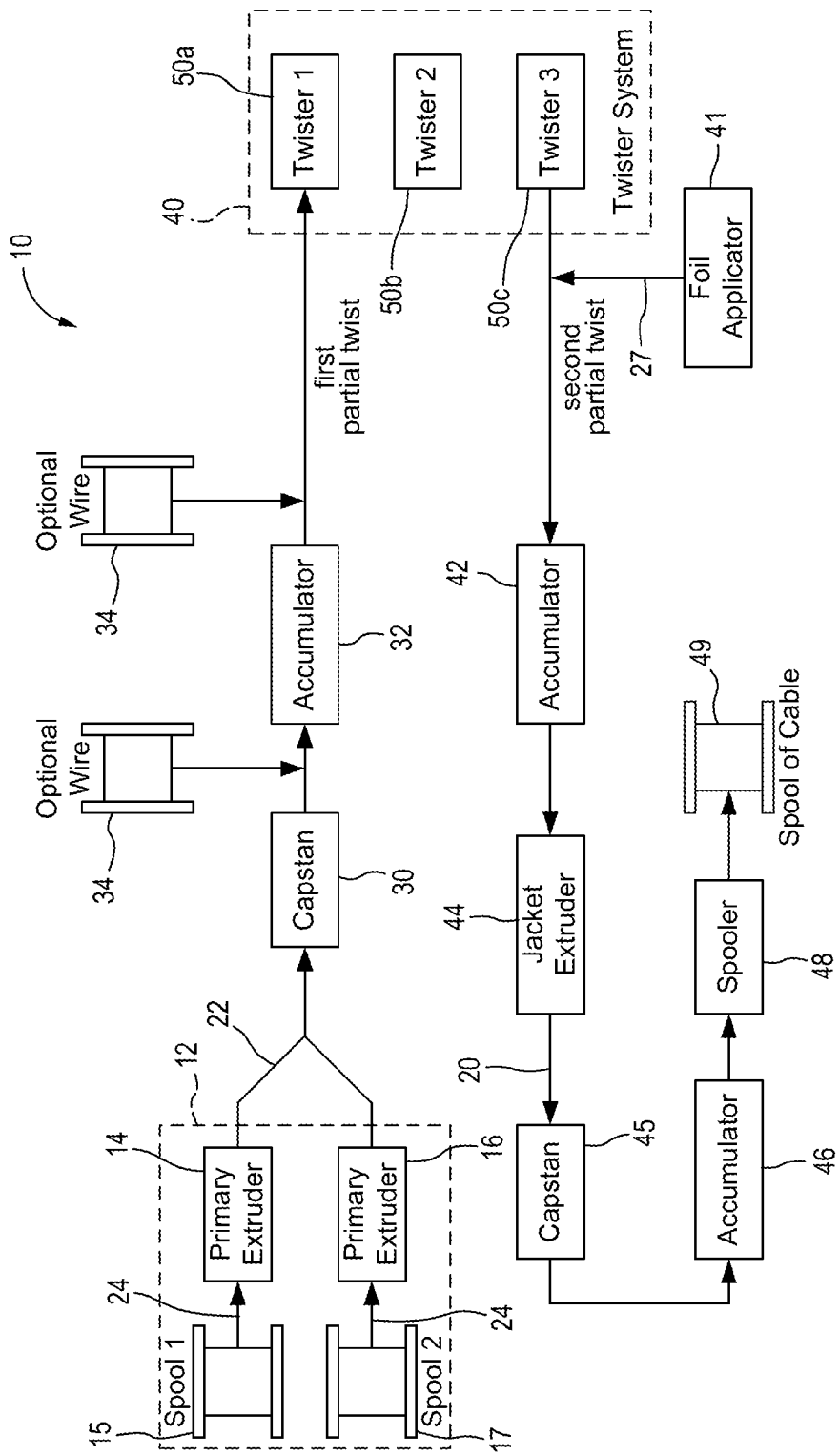
FIG. 1 is a block diagram of a system for producing a cable comprising multiple twisted conductors according to an exemplary embodiment.
Figure 4:
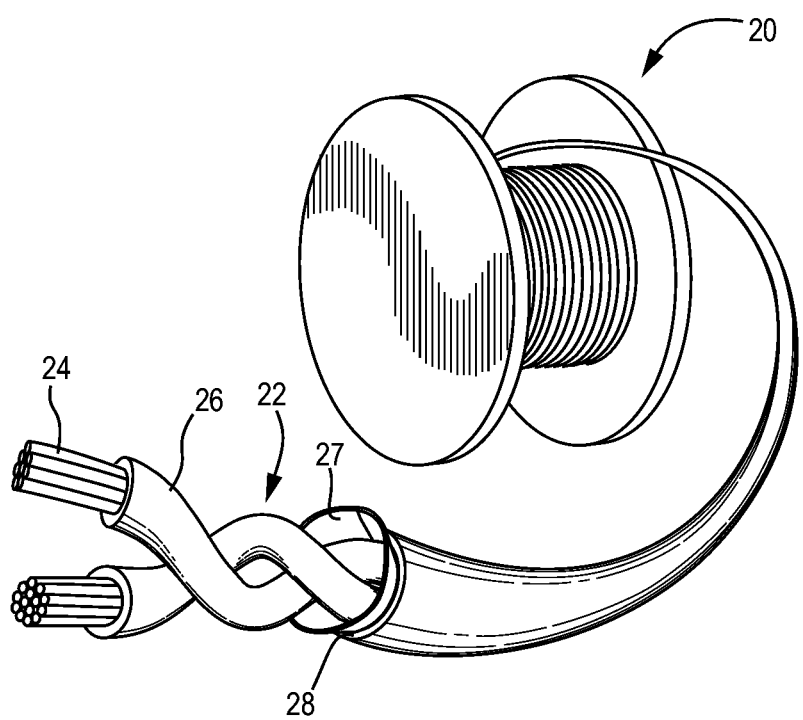
FIG. 4 is a perspective cutaway view of a cable comprising multiple wires twisted together according to an exemplary embodiment.

Referring to FIG. 1, a system 10 for producing a cable (e.g., a cable including a plurality of insulated conductors, such as cable 20 shown in FIG. 4) is shown according to one exemplary embodiment. System 10 is configured to be operated in a substantially continuous manner (e.g., such that bare wire may be continuously drawn from spools 15, 17, and jacketed cable may be continuously taken up on spool 49). System 10 includes a primary extruder system 12, one or more capstans 30, 45, one or more accumulators 32, 42, 46, a twister system 40, a jacket extruder 44, and an output spooler 48. More or fewer system components than those shown in FIG. 1 may be used according to various alternative embodiments.

According to an exemplary embodiment, primary extruder system 12 applies an insulative coating 26 to bare conductors 24 (e.g., bare copper wires, etc.) and provides one or more insulated conductors or wires 22 to be twisted together with twister system 40. According to one embodiment, primary extruder system 12 includes at least two primary extruders 14 and 16. Each primary extruder 14, 16 is fed a bare conductor 24, such as a metal (e.g., copper, etc.) wire from a spool 15, 17. Conductor 24 may be a wire formed from a variety of conductive materials such as copper, copper-covered steel, copper alloys, aluminum, or any other suitable metal or alloy. Conductor 24 may be plated with a second material such as tin or silver. Conductor 24 may be a solid wire or may comprise multiple strands.

Insulative coating 26 provides an electrically insulating layer over bare conductors 24 and separates conductors 24, electrically and physically, from each other within cable 20.

Insulative coating 26 may be a solid (e.g., a thermoplastic or a thermoplastic), a cellular foam, or semi-solid utilizing air as a dielectric medium. Insulative coating 26 may be colored and/or patterned to facilitate the identification of various conductors 24 (e.g., to identify polarity, signal channels, ground, etc.). Printing, graphics, or other identifying features may be provided on the outer surface of coating 26.

According to an exemplary embodiment, each primary extruder 14, 16 includes a line control (e.g., a computer controller, processor, etc.) to automatically control the line speed of extruders 14, 16, the amount of insulative coating 26 applied to each conductor 24, and the output rate of insulated conductor 22, which are subsequently directed to twister system 40. The speed of extruders 14, 16 may be controlled based on, for instance, monitoring the outside diameter of the insulated conductor 22 with a device such as a laser micrometer or other suitable sensor or device.

While FIG. 1 shows primary extruding system 12 comprising two primary extruders 14 and 16, in other embodiments, primary extruding system 12 may include more than two primary extruders and supply more than two insulated conductor 22 to be twisted by twister system 40 (e.g., for multiple conductor cable configurations including triples, quads, etc.).

Insulated conductors 22 output from primary extruder system 12 are directed through a capstan 30 to an accumulator 32. Multiple insulated conductors 22 may be output from capstan 30 to an associated accumulator 32 at the same speed. In one exemplary embodiment, each insulated conductor 22 is run through a separate capstan 30, with the capstans 30 electronically and/or mechanically locked together with one speed control, such as a potentiometer. In other exemplary embodiments, multiple insulated conductors 22 may be routed through a single capstan 30.

Accumulator 32, as well as accumulators 42 and 46, may serve as material buffers, allowing a length of insulated conductor 22 to collect, or amass, when the accumulator input rate is greater than the accumulator output rate, and alternatively, to provide additional lengths of insulated conductor 22 when the output rate is greater than the input rate. First accumulator 32 allows for primary extruder system 12 and/or twister system 40 to be momentarily stopped (e.g., to change out spools 15, 17, or switch twisters 50) without interrupting the continuous operation of the overall system. As will be described in more detail below, the state of first accumulator 32 (e.g., the amount of insulated conductor 22 collected) may be used to control operational parameters of the twister system 40.

In some embodiments, one or more optional or additional wires 34 may be included with wires 22 output from primary extruder system 12. According to various exemplary embodiments, additional wire 34 may be introduced before capstan(s) 30, before accumulator 32, before twister system 40, and/or at any other suitable location. In some embodiments, rather than an additional wire 34, a filler or buffer, such as string, a PVC filler, etc. may be included (e.g., to provide a "rounder" finished cable).

Figure 2:
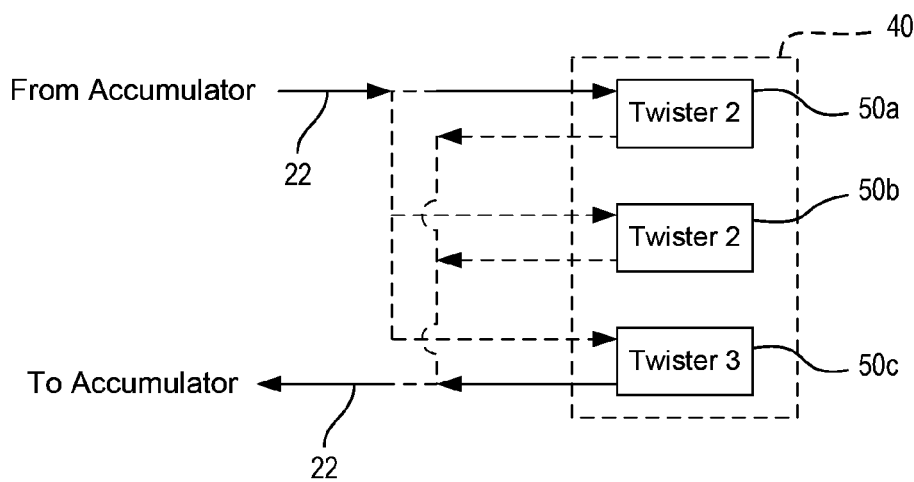
FIG. 2 is a block diagram of a twister system for twisting wires together according to an exemplary embodiment.
Figure 3:
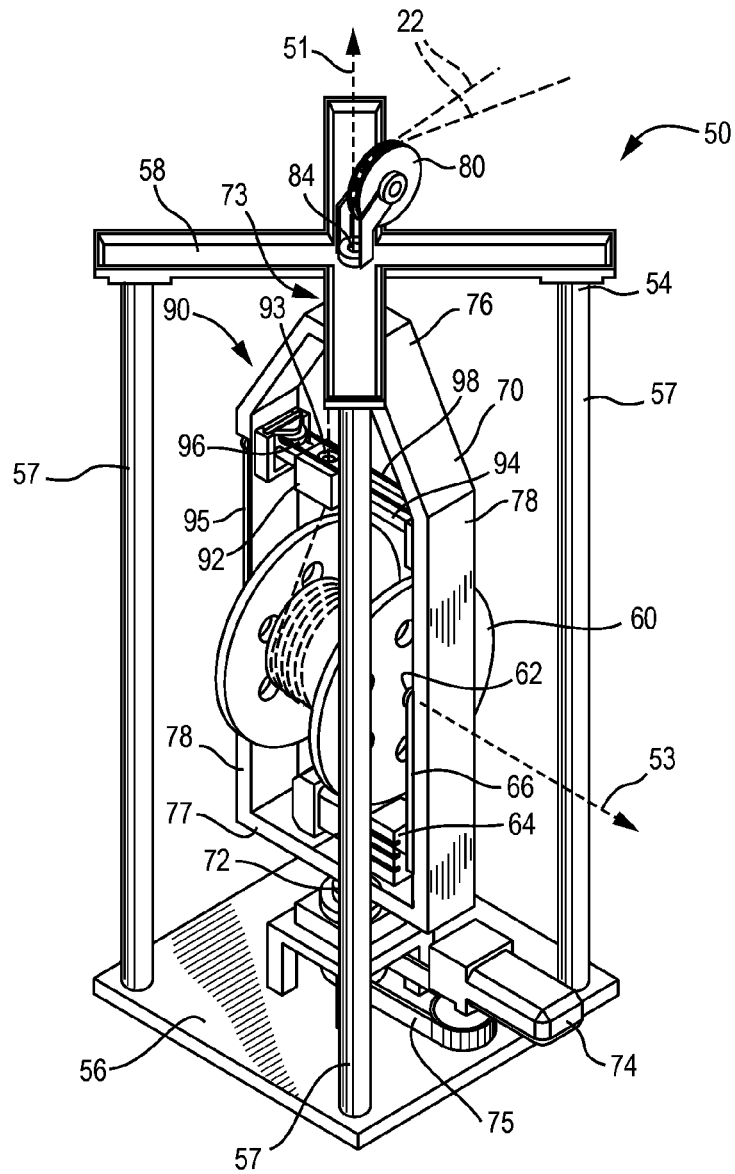
FIG. 3 is an isometric view of a twisting mechanism for a twisting system according to an exemplary embodiment.

Referring now to FIGS. 2-3, according to an exemplary embodiment, twister system 40 includes at least two bunchers or twisters 50 (shown in FIG. 2 as twisters 50a, 50b, 50c). Twisters 50 are configured to twist insulated conductors 22 together while taking up insulated conductors 22 on a spool 60 (i.e., in an input configuration). Twisters 50 may then be reversed (e.g., to pay off, rather than take up wire) and apply an additional twist to insulated conductors 22 as insulated conductors 22 are payed back off spool 60 (i.e., in an output configuration) to form twisted pairs of insulated conductors. Twister system 40 may be configured such that one twister 50a may be taking up insulated conductors 22 on a spool 60 while another twister 50c is simultaneously paying off insulated conductors 22 from another spool 60. Additional twisters (e.g., twister 50b) in twister system 40 may be idle or may be converted from a taking up or input operation to a paying off or output operation.

According to an exemplary embodiment, a first portion of a desired final twist is applied to insulated conductors 22 as insulated conductors 22 pass from the accumulators 32 to the twister system 40 and are twisted together. According to an exemplary embodiment, the first portion is approximately 10 percent of the desired final twist. According to another exemplary embodiment, the first portion is approximately 50 percent of the desired final twist. As used herein, a "desired twist" and similar terms represent the amount of twist required to produce a desired twist length, in which the conductors are rotated 360 degrees about each other (e.g., to form a twisted pair, triple, quad, etc.). In some embodiments, the full amount of desired twist may be applied by the twisters during either taking up or paying off of the conductors.

Insulated conductors 22 are output from the twister system 40 to accumulator 42. A second portion of the desired final twist is applied to insulated conductors 22 as insulated conductors 22 pass from twister system 40 to second accumulator 42. According to an exemplary embodiment, the second portion of twist is approximately 90 percent of the desired final twist. According to another exemplary embodiment, the second portion is approximately 50 percent of the desired final twist. According to an exemplary embodiment, the desired twist results in a twist or lay length of approximately 3 inches, while in other embodiments other twist or lay lengths may be utilized.

In some embodiments, one or more insulated wires may be "pre-twisted" (e.g., twisted about its own axis) prior to the insulated conductors being twisted together. The pre-twist may be in the same direction as the wires are twisted, or may be in an opposite direction (e.g., a "back twist"). The direction and amount of pre-twist applied to each insulated conductor may be varied according to various alternative embodiments.

Referring back to FIG. 1, in some embodiments, a shielding member 27 may be applied to insulated conductors 22. In one embodiment shielding 27 is conductive such that signals transmitted through conductors 24 do not radiate and/or interfere with signals in other nearby cables and/or circuitry. Shielding 27 further protects the signals transmitted through conductors 24 from external interference. Shielding 27 is generally formed of a conductive material such as a metal according to one embodiment, but may be formed of a semiconductive or other material according to alternative embodiments. As shown in FIG. 4, in an exemplary embodiment, shielding 27 is formed of a metallic foil that is wrapped around insulated conductors 22. According to other exemplary embodiments, rather than or in addition to a shielding, a filler, separator, or similar material may be provided, such as braided wire, spiral-wrapped wire, a polyester or mylar tape, tissue paper, a water blocking seal material or tape, or a combination of such components.

Shielding 27 may be applied to insulated conductors 22 after they have been twisted together by twister system 40. According to an exemplary embodiment, a shielding applicator 41 is provided between twister system 40 and accumulator 42. A separate shielding applicator 41 may be provided for each twister 50 in twister system 40, or a single shielding applicator 41 may be utilized for the entire twister system 40. According to one embodiment, shielding applicator 41 is non-motorized and includes a pad or roll of a metallic foil. Shielding applicator 41 may be near the exit of twister 50 and a foil may be pulled onto insulated conductor 22 and wrapped around insulated conductor 22 as a second portion of a desired twist is applied. In another embodiment, shielding applicator 41 may be a motorized shielding applicator that wraps a metallic foil around insulated conductors 22 that have already been twisted together. For instance, a motorized shielding applicator may be provided outside of twister system 40 and apply a foil shielding to the insulated conductors 22 before they enter accumulator 42. By providing shielding applicator 41 between twister system 40 and accumulator 42, accumulator 42 may amass a length of shielded cable that may be fed to downstream components of system 10 while shielding applicator 41 is stopped to replenish the shielding material, thus allowing a continuous operation of system 10 to be maintained. In further embodiments, shielding 27 may be applied after accumulator 32, or after accumulator 42 to one or more conductors.

Insulated conductors 22 with (optional) shielding 27 are output from accumulator 42 and received at jacket extruder 44 as a twisted pair (or, alternatively, a triple or quad, etc.) of insulated conductors. Jacket extruder 44 applies an insulative coating or jacket 28 around the twisted insulated conductors 22 (and shielding 27). Jacket 28 physically protects the internal components of cable 20 both from damage during installation, and from damage due to the environment during the life of cable 20. Further, jacket 28 may improve the appearance of cable 20 and/or provide flame retardancy to cable 20. According to an exemplary embodiment, jacket 28 may be a thermoplastic such as PVC, PE, PP, PU, PVDF, ECTFE, ETFE, FEP, or TFE. In other exemplary embodiments, jacket 28 may be a thermoset such as natural rubber, or a synthetic rubber such as SBR, polychloroprene, CSPE, EPDM, or silicone rubber.

As discussed in more detail below and similar to first accumulator 32, and second accumulator 42 allow for twister system 40 and/or jacket extruder 44 to be momentarily stopped (e.g., to switch out twisters 50) without interrupting the continuous operation of the overall system.

Cable 20 output from jacket extruder 44 passes through a second capstan 45 to a third accumulator 46. Similar in operation to first accumulator 32 and second accumulator 42, third accumulator 46 provides a "buffer" between jacket extruder 44 and spooler 48. Spooler 48 includes an output spool 49 upon which cable 20 is wound. When output spool 49 is full, spooler 48 may be momentarily stopped to allow for an empty output spool 49 to be loaded. While spooler 48 is stopped, third accumulator 46 may collect cable 20 output from jacket extruder 44 via capstan 45. Spooler 48 may be activated and/or controlled by accumulator 46 to be run at an accelerated speed to pull any excess length of cable 20 from accumulator 46. Once accumulator 46 reaches a predetermined level, the speed of spooler 48 may be reduced and operated at a reduced speed until output spool 49 is again full and changed out.

Referring now to FIG. 3, a twister 50 is shown in greater detail according to an exemplary embodiment. In one embodiment, twister 50 includes a frame 54 within which a cradle 70 rotates. A spool 60 is mounted to rotating cradle 70 which is, in turn, supported by frame 54. Cradle 70 rotates about an axis 51 on a lower support shaft 72 and an upper support shaft 73. Spool 60 rotates about an axis 53 that is stationary relative to and rotates with cradle 70. Insulated conductors 22 are directed to spool 60 by a guide wheel 80 and a traverse assembly 90.

Frame 54 includes a lower platform or base 56 and an upper platform or top 58. Top 58 is supported above base 56 by one or more vertical columns 57. According to an exemplary embodiment, top 58 is an X-shaped member with four arms each supported at a distal end by a column 57. Lower support shaft 72 of cradle 70 is rotatably coupled to base 56, and an upper support shaft 73 of cradle 70 is rotatably coupled to top 58. According to one embodiment, columns 57 provide structural support to top 58 and allow access to spool 60, cradle 70, and traverse assembly 90 disposed within frame 54. According to other exemplary embodiments, frame 54 may further include a cage, fence, or other device to selectively limit the access to the interior of twister 50 and/or limit exposure to various moving components.

Spool 60 rotates about axis 53 by way of an axle or shaft 62. Shaft 62 is rotatably coupled to cradle 70. Spool 60 is driven by a power source, shown in FIG. 3 as a motor 64 coupled to cradle 70 below spool 60. Motor 64 drives spool 60 via a power transfer device. According to one exemplary embodiment, the output shaft of the motor 64 is parallel to shaft 62 and axis 53 and motor 64 is coupled to the shaft 62 via a belt 66. In other exemplary embodiments, another intermediate device such as a gearbox may be provided between motor 64 and shaft 62.

In other exemplary embodiments, motor 64 may be coupled to frame 54 and not rotate with cradle 70. For example, motor 64 may be mounted below frame 54 (e.g., below the base 56) and have an output shaft that is oriented along vertical axis 51. The output shaft of motor 64 may extend up through frame 54 and through lower support shaft 72 of the cradle 70. Motor 64 may then drive belt 66 via a right-angle gearbox or other suitable mechanism that is coupled to cradle 70. In this way, motor 64 may be powered by a voltage without the use of, for example, a rotating electrical contact. Further, removal of motor 64 from cradle 70 reduces the rotational inertia of cradle 70.

Spool 60 is rotated about axis 51 by cradle 70 to twist insulated conductor 22 together as they are taken up on and/or payed off from spool 60. Cradle 70 includes a top 76 and a bottom 77 that are coupled together with side members 78. Cradle 70 is a generally open component, allowing for the free rotation of spool 60.

In one embodiment, lower support shaft 72 and upper support shaft 73 are coaxial with axis 51. Upper support shaft 73 extends from top 76 of cradle 70 and is rotationally coupled to top 58 of frame 54. Upper support shaft 73 may be hollow to allow the passage of insulated conductor 22 to spool 60. Lower support shaft 72 extends downward from bottom 77 of cradle 70 and is rotationally coupled to base 56 of frame 54 (e.g., via a bearing). Lower support shaft 72 may be a hollow member to accommodate the output shaft of motor 64 driving spool 60.

In some embodiments, cradle 70 is driven by a motor 74 that is coupled to frame 54. According to an exemplary embodiment, motor 74 is coupled to base 56 and has an output shaft that is parallel to axis 51. In some embodiments, motor 74 drives cradle 70 and shaft 72 via a power transfer device such as a belt 75. In other exemplary embodiments, another intermediate device such as a gearbox may be provided between motor 74 and lower support shaft 72.

While motor 74 and belt 75 are shown in FIG. 3 as being mounted on the upper surface of base 56, in other embodiments, motor 74 and/or belt 75 may be disposed below base 56. In still other exemplary embodiment, motor 74 and/or belt 75 may be coupled to the top of frame 54.

In operation, insulated conductors 22 are routed to spool 60 by guide wheel 80 and traverse assembly 90. Guide wheel 80 is coupled to top 58 of frame 54. Guide wheel 80 may be a freely rotating member and arranged such that it is substantially tangent to axis 51. Insulated conductors 22 from accumulator 32, with any additional wires 34, wrap around guide wheel 80 and run downward through an aperture 84 in frame 54. In one embodiment, aperture 84 is aligned with axis 51. After passing through aperture 84, insulated conductor 22 extend through upper support shaft 73 and through an opening in top 76 of cradle 70 to traverse assembly 90.

Traverse assembly 90 is removeably mounted to cradle 70. According to an exemplary embodiment, traverse assembly 90 extends between sides 78 of cradle 70 and is disposed between spool 60 and top 76. Traverse assembly 90 may in some embodiments be configured to evenly distribute insulated conductor 22 along the width of spool 60 as the insulated conductors are wound onto spool 60. Traverse assembly 90 includes a shuttle 92 that moves back and forth along a rail 94. In one embodiment, shuttle 92 is propelled by a drive mechanism 96 via a belt 98.

According to an exemplary embodiment, shuttle 92 includes a central aperture 93 through which insulated conductors 22 pass. Shuttle 92 may further include one or more openings (e.g., slots, sockets, shafts, apertures, etc.) that receive a rail 94 to guide the motion of shuttle 92. According to an exemplary embodiment, rail 94 includes two members that are spaced about either side of aperture 93, allowing for passage of insulated conductors 22.

In some embodiments, shuttle 92 is propelled along rail 94 by drive mechanism 96. According to an exemplary embodiment, drive mechanism 96 includes a gear train disposed on one side 78 of cradle 70. Drive mechanism 96 interacts with shuttle 92 via a belt 98 (e.g., a timing belt, etc.). Belt 98 and drive system 96 interact with shuttle 92 to cause shuttle 92 to traverse back and forth along rail 94.

According to an exemplary embodiment, drive mechanism 96 is powered by spool motor 64 via a belt 95 that is provided along one of sides 78, extending between shaft 62 and drive mechanism 96. The speed of the traverse assembly may be based on the rotational speed of the spool. According to an exemplary embodiment, the traverse assembly moves shuttle 92 across rail 94 at a rate of between approximately 0.25 and 0.50 inches per spool revolution.

Traverse assembly 90 is configured such that drive mechanism 96 may be disengaged from shuttle 92 (e.g., by disengaging one or more spring-loaded gears, etc.) such that shuttle 92 is unpowered and stationary at a point along rail 94. According to another exemplary embodiment, traverse assembly 90 may be selectively neutralized by utilizing an overrunning clutch. It should be noted that in various alternative embodiments, any traverse assembly that may be neutralized may be utilized. According to various alternative embodiments, other types of drive mechanisms may be used to propel shuttle 92 along traverse assembly 90.

Referring back to FIG. 2, twister system 40 is operated such that some insulated conductor 22 may be taken up with one twister 50 while other insulated conductors 22 are simultaneously being payed off from another twister 50. While twister 50a is shown as the input unit, taking up insulated conductor 22, any of the twisters in twister system 40 may serve as the input twister. Likewise, while twister 50c is shown as the output twister, paying off insulated conductor 22, any of the twisters in twister system 40 not being utilized to take up insulated conductor 22 may serve as the output twister. Any twister not taking up or paying off insulated conductor 22 may be idle or may be in the process of being reconfigured to take up or pay off insulated conductor 22.

When taking up insulated conductor 22, twister 50 may be operated by feeding insulated conductors 22 over guide wheel 80, through aperture 84, and through openings in frame 54 and cradle 70 to traverse assembly 90. Insulated conductor 22 pass through central aperture 93 of shuttle 92 and are coupled to spool 60. Motor 64 may then rotate spool 60 about axis 53 and operate drive mechanism 96 of traverse assembly 90. Insulated conductors 22 are wound onto rotating spool 60 and evenly distributed on spool 60 by shuttle 92 as shuttle 92 is moved back and forth along rail 94 by drive mechanism 96. Cradle 70 rotates about axis 51 to apply a first portion of a desired final twist to insulated conductor 22 as they are taken up on spool 60.

In some embodiments, the rotational speed of spool 60 as it is taking up insulated conductor 22 may be controlled based on the state of accumulator 32. For instance, a twister 50 being operated in a take up or input mode may be controlled by and/or provide feedback to accumulator 32. Input twister 50 in twister system 40 is switched over once the spool 60 is full, during which time insulated conductors 22 are stopped between accumulator 32 and twister system 40 and moved from a full twister 50 to an empty/idle twister 50. Primary extruder system 12 and capstan 30 continue to operate during this process, maintaining the continuous manner of operation of system 10. As twister 50 with a full spool 60 (e.g., twister 50a) is changed out for an idle twister 50 (e.g., twister 50b), accumulator 32 collects wires 22 being output by primary extruder system 12. Once input twisters 50 have been changed over, accumulators 32 may be in an expanded state, and a new/empty twister 50 may be activated and run at an accelerated speed to pull any excess length of insulated conductors 22 from accumulator 32. Once accumulator 32 reaches a predetermined or "normal" level, the speed of twister 50 may be reduced and operated at a reduced/normal speed until twister 50 is full and again changed out for another twister 50.

The rotational speed of cradle 70, along with the incoming line speed of insulated conductor 22 (e.g., the output rate from accumulators 32), determines the amount of twist applied in the first portion of the desired final twist to the insulated conductor 22. The rotational speed of the cradle 70 may be controlled to apply any desired amount of twist to insulated conductor 22 (e.g., 10 percent of a desired twisted, 50 percent of a desired twist, etc.).

When paying off insulated conductor 22, twister 50 may be operated by first moving shuttle 92 into a central position roughly aligned with axis 51, and disengaging drive mechanism 96 of traverse assembly 90. Insulated conductors 22 wound onto spool 60 are then fed through central aperture 93 of shuttle 92, and aperture 84 in frame 54. Insulated conductors 22 then pass back over guide wheel 80 and are routed to accumulator 42 (see FIG. 1). Motor 64 is activated to rotate spool 60 in the opposite direction as it rotated to take up insulated conductor 22. Insulated conductor 22 are payed off rotating spool 60 and are fed to accumulator 42. Cradle 70 rotates about the axis 51 in the same direction as in the take-up operation to apply a second portion of the desired final twist to insulated conductor 22. Disabling traverse assembly 90 and centralling locating shuttle 92 when paying off insulated conductor 22 avoids an "out of time" situation where insulated conductor 22 may be payed off from one side of spool 60 while shuttle 92 is above an opposite side of spool 60. The amount of deflection experienced by insulated conductor 22 as they are payed off spool 60 is therefore reduced. In some embodiments, shuttle 92 may be replaced with a conventional guide wheel to guide the insulated conductors.

The rotational speed of spool 60 as it is paying off wire 22 may be controlled based on the state of second accumulator 42 (e.g., based on the amount of wire accumulated). For example, the rotational speed of spool 60 may be controlled to increase or decrease inversely with the amount of wire accumulated (e.g., such that spool 60 rotates slower as more wire is accumulated).

Second accumulator 42 allows jacket extruder 44 to be operated continuously as twisters 50 in twister system 40 are being switched. The state of accumulator 42 may be utilized to control the operational parameters of jacket extruder 44. According to an exemplary embodiment, the position of accumulators 32, 42, 46 and the length of insulated conductor 22 amassed in the accumulators 32, 42, 46 may be sensed by a device such as an ultrasonic proximity sensor. Other methods may be used to detect the states of the various accumulators according to various other embodiments.

Figure 5:
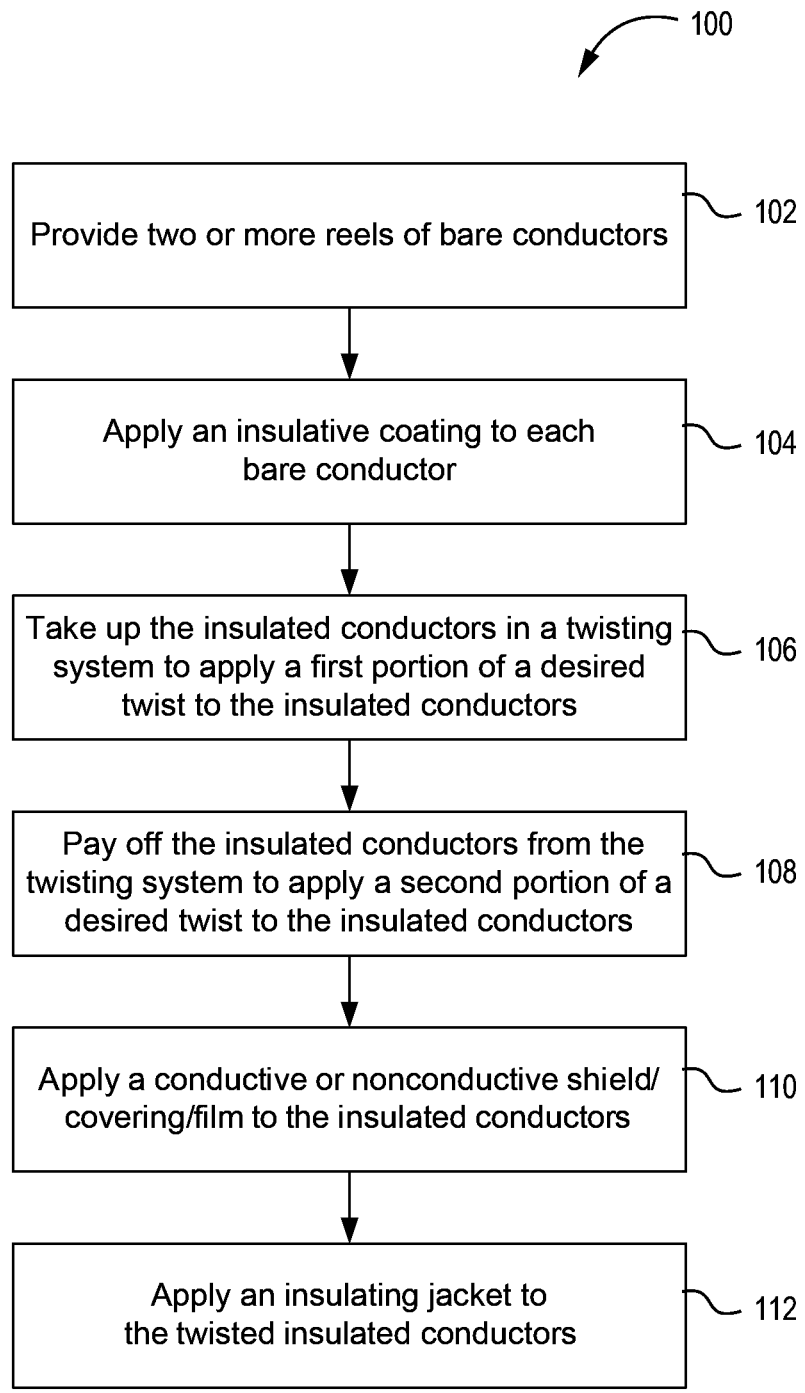
FIG. 5 is a flowchart illustrating a method for producing a cable comprising multiple twisted conductors according to an exemplary embodiment.

Referring now to FIG. 5, a method 100 for producing a cable is shown according to an exemplary embodiment. Two or more bare conductors are provided (step 102) and an insulative coating is applied to the conductors (step 104). The insulated conductors are routed to a twisting system, with a first portion of a desired twist (e.g., 10 percent, 50 percent, etc.) being applied to the insulated conductors as the conductors are taken up by the twisting system (step 106). A second portion of the desired twist (e.g., 90 percent, 50 percent, etc.) is applied to the insulated conductors as they are payed off from the twisting system (step 108). The amount of twist applied as the insulated conductors are taken up/off from the twisters may be varied according to various alternative embodiments. In some embodiments, a conductive shield is applied to the twisted wires (step 110). An insulating jacket is then applied to the twisted wires (step 112).

By applying a twist to the wires both as the wires enter and exit twister system 40, the output of the overall cable production process may be increased, (e.g., allowing the cable to be twisted continuously in combination with the other cable manufacturing processes discussed herein). In this way, the number of operators of the system may be reduced, or a similar number of operators may operate multiple systems in parallel to increase the cumulative production output. The continuous process allows for "just-in-time" manufacturing based on customer orders, and results in reduced space needed for inventory. According to an exemplary embodiment, system 10 and the associated methods may produce a cable 20 at a rate of approximately 150 feet per minute.

By operating the system 10 continuously, an output comparable to or greater than a traditional cable manufacturing system may be achieved while reducing the line speed of the various components in the system 10. For instance, an extruder in a traditional cable manufacturing system may be run at speeds of more than 300-400 feet/minute. In a continuously system 10 using multiple twisters 60, the line speed of the extruder may be reduced to approximately 100 feet/minute while maintaining or even increasing the overall output of the system 10.

Because system 10 and the associated methods may comprise continuous processes, insulated conductor 22 and/or cable 20 do not need to be wound on intermediate spools and physically moved/transferred between different portions of the system, as in typical cable manufacturing systems. In this way, the potentially dangerous movement of intermediate spools between portions of a cable manufacturing system is eliminated, reducing the likelihood of injuries such as back or shoulder injuries for operators of the system 10.

It should be noted that the various features discussed herein with respect to the embodiments shown in the FIGURES may be used alone, or in combination, and all such features and combinations of features are within the scope of the present disclosure. Further, while various embodiments discussed herein relate to using a twister having a rotating cradle, according to various alternative embodiments, other types of twisters may be utilized (e.g., a flying arm twister, etc.).

For purposes of this disclosure, the term "coupled" shall mean the joining of two members directly or indirectly to one another. Such joining may be stationary in nature or movable in nature. Such joining may be achieved with the two members or the two members and any additional intermediate members being integrally formed as a single unitary body with one another or with the two members or the two members and any additional intermediate member being attached to one another. Such joining may be permanent in nature or alternatively may be removable or releasable in nature. Such joining may also relate to mechanical, fluid, or electrical relationship between the two components.

Various system components herein may include, be controlled by, and/or communicate with a computer controller, processing unit, processing circuit, and the like. Various processing circuits may be utilized in connection with the various embodiments disclosed herein, including a variety of digital or analog circuits, various types of computer readable media, etc.

It is important to note that the construction and arrangement of the elements of the methods and systems as shown in the exemplary embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, materials, colors, orientations, etc.) without materially departing from the novel teachings and advantages of the subject matter recited in the embodiments. Accordingly, all such modifications are intended to be included within the scope of the present disclosure as defined in the appended claims. The order or sequence of any process or method steps may be varied or re-sequenced according to alternative embodiments. Other substitutions, modifications, changes, and/or omissions may be made in the design, operating conditions, and arrangement of the exemplary embodiments without departing from the spirit of the present disclosure.

What is claimed is:

1. A method for producing cable, the method comprising:
   applying an insulative coating to each of a plurality of conductors at a primary extruder system to form a plurality of insulated conductors having a first end and a second end;
   directing the plurality of insulated conductors from the primary extruder system to a twisting system;
   taking up the plurality of insulated conductors on a spool of the twisting system with the first end leading the second end to twist the plurality of insulated conductors together and apply a first portion of a desired twist to the plurality of insulated conductors, wherein the spool defines an axis and rotates in a first direction about the axis and within a spool cradle to take up the plurality of insulated conductors;
   paying off the plurality of insulated conductors from the spool of the twisting system with the second end leading the first end, to further twist the plurality of insulated conductors together and apply a second portion of a desired twist to the plurality of insulated conductors to form a twisted plurality of insulated conductors having the desired twist, wherein the spool rotates in a second direction opposite the first direction about the axis and within the spool cradle to pay off the plurality of conductors; and directing the twisted plurality of insulated conductors from the spool to a jacket extruder configured to apply an outer jacket over the twisted plurality of insulated conductors.

2. The method of claim 1, wherein the first portion of the desired twist is approximately one-half of the desired twist and wherein the second portion of the desired twist is approximately one-half of the desired twist.

3. The method of claim 1, wherein the first portion of the desired twist is less than the second portion of the desired twist.

4. The method of claim 1, wherein the desired twist results in a twist length of approximately 3 inches.

5. The method of claim 1, wherein the twisting system comprises a plurality of twisters.

6. The method of claim 5, wherein the plurality of insulated conductors is a first plurality of insulated conductors, the method further comprising paying off the first plurality of insulated conductors while simultaneously taking up a second plurality of insulated conductors.

7. The method of claim 6, wherein paying off the first plurality of insulated conductors while simultaneously taking up a second plurality of insulated conductors comprises paying off the first plurality of insulated conductors using a first twister while simultaneously taking up a second plurality of insulated conductors using a second twister.

8. The method of claim 1, further comprising applying a conductive shield to the twisted plurality of insulated conductors.

9. The method of claim 8, further comprising applying a jacket to the exterior of the conductive shield.

10. The method of claim 1, further comprising controlling a rotational speed of the first spool in the first direction while taking up the plurality of insulated conductors based on a state of a first accumulator.

11. A method comprising:
applying an insulative coating to each of a first plurality of conductors at a primary extruder system to form a first plurality of insulated conductors;
directing the first plurality of insulated conductors from the primary extruder system to a twisting system;
taking up the first plurality of insulated conductors on a first spool of the twisting system to twist the first plurality of insulated conductors together and apply a first amount of a desired first twist to the first plurality of insulated conductors, wherein the first spool defines a first axis and rotates in a first direction about the first axis and within a first cradle to take up the first plurality of insulated conductors; and
applying an insulative coating to each of a second plurality of conductors at the primary extruder system to form a second plurality of insulated conductors;
directing the second plurality of insulated conductors from the primary extruder system to the twisting system;
taking up the second plurality of insulated conductors on a second spool of the twisting system with a first end of the second plurality of insulated conductors leading a second end of the second plurality of conductors to apply a first amount of a desired second twist, wherein the second spool defines a second axis and rotates in the first direction about the second axis and within a second cradle to take up the second plurality of insulated conductors;
simultaneous with taking up the first plurality of insulated conductors, paying off the second plurality of insulated conductors from the second spool of the twisting system with the second end leading the first end to apply a second amount of the desired second twist to the second plurality of insulated conductors, wherein the second spool rotates in a second direction opposite the first direction about the second axis and within the second cradle to pay off the second plurality of insulated conductors;
directing the second plurality of insulated conductors from the second spool to a jacket extruder configured to apply an outer jacket over the second plurality of insulated conductors.

12. The method of claim 11, further comprising applying a second amount of the desired first twist to the first plurality of insulated conductors to obtain the desired first twist, wherein the first amount of twist is approximately 50 percent of the desired first twist.

13. The method of claim 11, wherein the twisting system comprises at least three twisting devices.

14. The method of claim 10, further comprising controlling a rotational speed of the first spool in the second direction while paying off the plurality of insulated conductors based on a state of a second accumulator.

* * * * *